United States Patent
Egri

(10) Patent No.: US 9,191,261 B2
(45) Date of Patent: Nov. 17, 2015

(54) SYSTEM AND METHOD FOR TRANSMITTING A QUADRATURE AMPLITUDE MODULATION (QAM) WAVEFORM TO A RECEIVER

(71) Applicant: Raytheon BBN Technologies Corp., Cambridge, MA (US)

(72) Inventor: Robert Gyorgy Egri, Carlisle, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 14/189,135

(22) Filed: Feb. 25, 2014

(65) Prior Publication Data

US 2014/0286448 A1    Sep. 25, 2014

Related U.S. Application Data

(60) Provisional application No. 61/803,232, filed on Mar. 19, 2013.

(51) Int. Cl.
*H04L 27/34* (2006.01)
*H04L 27/36* (2006.01)

(52) U.S. Cl.
CPC .......... *H04L 27/3405* (2013.01); *H04L 27/362* (2013.01)

(58) Field of Classification Search
CPC ................ H04L 27/3405; H04L 27/362
USPC .................................. 375/298, 264
See application file for complete search history.

(56) References Cited

U.S. PATENT DOCUMENTS

| | | | |
|---|---|---|---|
| 5,121,070 A * | 6/1992 | Tomita | 329/304 |
| 5,867,071 A | 2/1999 | Chethik | |
| 2001/0034206 A1* | 10/2001 | Thompson et al. | 455/12.1 |
| 2004/0196923 A1 | 10/2004 | Feher | |

(Continued)

FOREIGN PATENT DOCUMENTS

| | | | |
|---|---|---|---|
| EP | 2501095 A1 | 9/2012 | |
| WO | WO-2014/149418 A1 | 9/2014 | |

OTHER PUBLICATIONS

"International Application Serial No. PCT/US2014/018215, International Search Report mailed May 26, 2014", 4 pgs.

(Continued)

*Primary Examiner* — Michael Neff
(74) *Attorney, Agent, or Firm* — Schwegman Lundberg & Woessner, P.A.

(57) ABSTRACT

An encoder can convert a stream of data into three or four synchronized 4-PSK signals, for 64-QAM and 256-QAM, respectively. Three or four mixers can combine the three or four synchronized PSK signals with a common local oscillator signal to form three or four respective amplifiable signals, which can all have the same amplitude. One amplifier receives a first of the amplifiable signals and powers one radiator. Two amplifiers both receive a second of amplifiable signals and power two respective radiators. Four amplifiers receive a third of the amplifiable signals and power four respective radiators. The amplifiers can all operate in near or full saturation. Each radiator radiates in one of a plurality of discrete, specified states. The radiated states from the radiators combine through far-field electromagnetic propagation and effectively sum at the receiver to mimic transmission from a single amplifier.

20 Claims, 2 Drawing Sheets

(56) References Cited

U.S. PATENT DOCUMENTS

2008/0292038 A1* 11/2008 Ide .............................. 375/355
2010/0323645 A1 12/2010 Kishimoto

OTHER PUBLICATIONS

"International Application Serial No. PCT/US2014/018215, Written Opinion mailed May 26, 2014", 6 pgs.

Miyauchi, Kazuhiro, et al., "New Technique for Generating and Detecting Multilevel Signal Formats", *IEEE Transactions on Communications*, (Feb. 1976), 263-267.

Tanaka, Masayoshi, "New Satellitte Communications System Using Power Combined M-ary Modulation Technology", *21st International Communications Satellite Systems Conference and Exhibit* (AIAA 2003-2288), (2003), 1-7.

Tanaka, Masayoshi, et al., "Spatially Superposed 16-QAM System with Ywo Offset-QPSK Signals", *28th AIAA International Communications Satellite Systems Conference* (ICSSC-2010) (AIAA 2010-8681), Aug. 30-Sep. 2, 2010, Anaheim, California, 1-9.

Tanaka, Masayoshi, et al., "Spatially Superposed M-ary QAM Wireless Communication System", *Proceedings of Asia-Pacific Microwave Conference 2006*, 4 pgs.

Cox, D. C., "Linear Amplification with Nonlinear Component", *IEEE Transcriptions on Communications*, vol. COM-22, No. 12, (Dec. 1974), 1942-1945.

Liang, Chuankang, et al., "Transmitter Linearization by Beamforming", *IEEE Journal of Solid-State Circuits*, 46(9), (Sep. 2011), 1956-1969.

\* cited by examiner

SYSTEM AND METHOD FOR TRANSMITTING A QUADRATURE AMPLITUDE MODULATION (QAM) WAVEFORM TO A RECEIVER

CLAIM OF PRIORITY

This application claims the benefit of priority to U.S. Provisional Application Ser. No. 61/803,232, filed Mar. 19, 2013, which is incorporated herein by reference in its entirety.

TECHNICAL FIELD

Examples pertain to configurations of amplifiers and radiators that transmit, receive, and/or steer electromagnetic radiation.

BACKGROUND

For military and commercial mm-wave communications, including frequencies between 70 GHz and 120 GHz and data rates that can exceed 1 Gb/sec, it is generally difficult to amplify a signal to a sufficiently high power to transmit more than a few kilometers. Typical solid state amplifiers at these frequencies and data rates are difficult to drive in their linear regime.

SUMMARY

An example is a system for transmitting a quadrature amplitude modulation (QAM) waveform to a receiver. First, second, and third mixers combine synchronized first, second, and third phase-shift keying (PSK) signals with a common local oscillator signal to form respective first, second, and third amplifiable signals. A first amplifier receives the first amplifiable signal and powers a first radiator in response to the received first amplifiable signal. Second and third amplifiers receive the second amplifiable signal and power respective second and third radiators in response to the received second amplifiable signal. Fourth, fifth, sixth, and seventh amplifiers receive the third amplifiable signal and power respective fourth, fifth, sixth, and seventh radiators in response to the received third amplifiable signal. Each of the first, second, third, fourth, fifth, sixth, and seventh radiators radiates in one of a plurality of discrete, specified states. The radiated states from the first, second, third, fourth, fifth, sixth, and seventh radiators combine through far-field electromagnetic propagation and effectively sum at the receiver to mimic transmission from a single amplifier.

Another example is a system for transmitting a quadrature amplitude modulation (QAM) waveform to a receiver. First, second, third, and fourth mixers combine synchronized first, second, third, and fourth phase-shift keying (PSK) signals with a common local oscillator signal to form respective first, second, third, and fourth amplifiable signals. A first amplifier receives the first amplifiable signal and powers a first radiator in response to the received first amplifiable signal. Second and third amplifiers receive the second amplifiable signal and power respective second and third radiators in response to the received second amplifiable signal. Fourth, fifth, sixth, and seventh amplifiers receive the third amplifiable signal and power respective fourth, fifth, sixth, and seventh radiators in response to the received third amplifiable signal. Eighth, ninth, tenth, eleventh, twelfth, thirteenth, fourteenth, and fifteenth amplifiers receive the fourth amplifiable signal and power eighth, ninth, tenth, eleventh, twelfth, thirteenth, fourteenth, and fifteenth radiators in response to the received fourth amplifiable signal. Each of the first, second, third, fourth, fifth, sixth, seventh, eighth, ninth, tenth, eleventh, twelfth, thirteenth, fourteenth, and fifteenth radiators radiates in one of a plurality of discrete, specified states. The radiated states from the first, second, third, fourth, fifth, sixth, seventh, eighth, ninth, tenth, eleventh, twelfth, thirteenth, fourteenth, and fifteenth radiators combine through far-field electromagnetic propagation and effectively sum at the receiver to mimic transmission from a single amplifier.

Another example is a method for transmitting a 64-QAM waveform to a receiver. A stream of data is converted into synchronized first, second, and third quadrature phase-shift keying (4-PSK) signals. The first, second, and third 4-PSK signals are combined with a common local oscillator signal to form respective first, second, and third amplifiable signals. A first radiator is powered in response to the first amplifiable signal. Second and third radiators are powered in response to the second amplifiable signal. Fourth, fifth, sixth, and seventh radiators are powered in response to the third amplifiable signal. Each of the first, second, third, fourth, fifth, sixth, and seventh radiators radiates in one of a plurality of discrete, specified states. The radiated states from the first, second, third, fourth, fifth, sixth, and seventh radiators combine through far-field electromagnetic propagation and effectively sum at the receiver to mimic transmission from a single amplifier.

This Summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
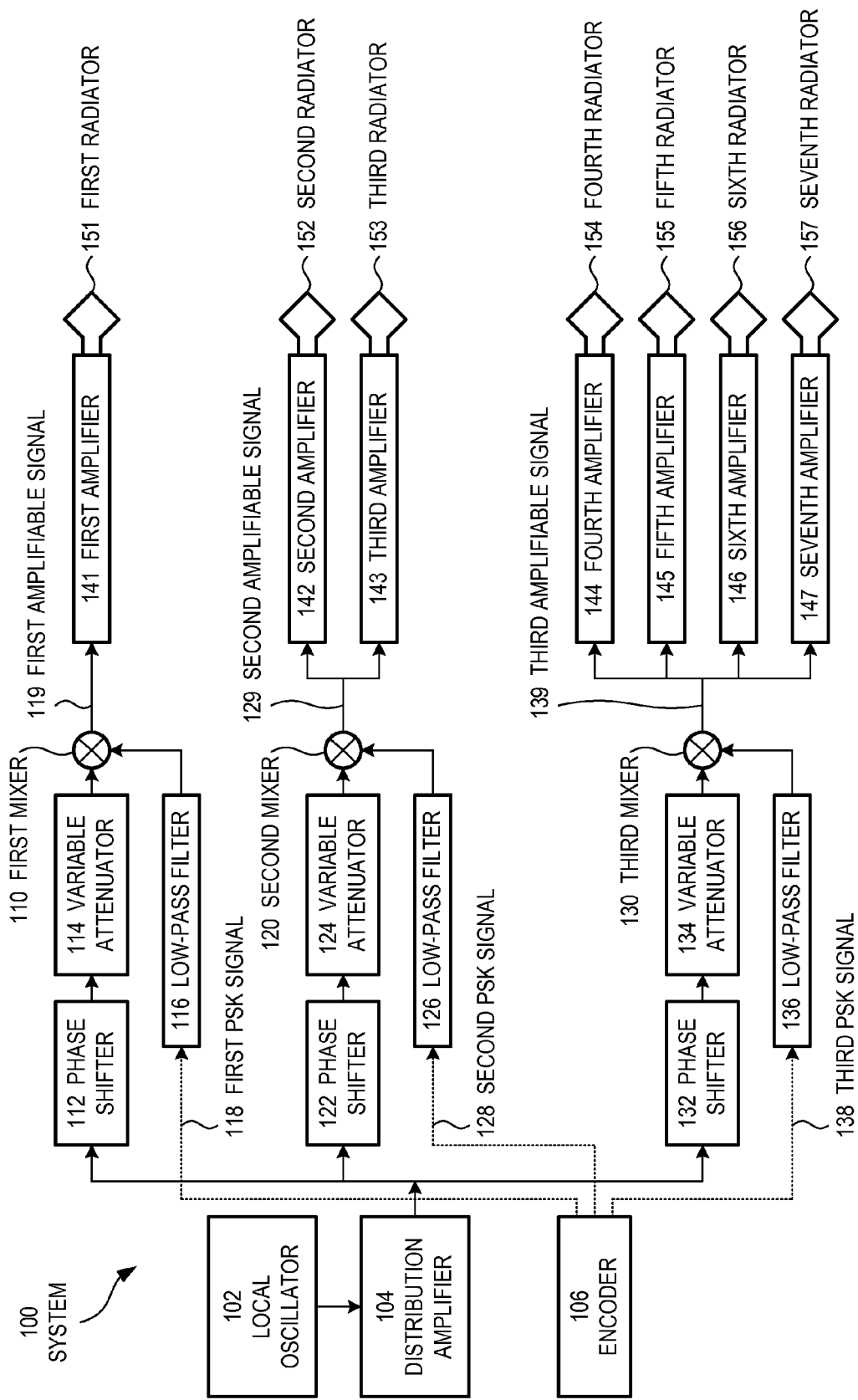
FIG. 1 is a schematic drawing of an example of a system for transmitting a quadrature amplitude modulation (QAM) waveform.

A transmission system encodes a data stream as a signal. The signal can attain one of a discrete, specified number of states that vary in amplitude and phase. The transmission system directs the signal to one or more radiators, such as antennas, and transmits the signal to a receiver at a remote location through free-space electromagnetic propagation. The transmission can be directional, with most or all of the signal being transmitted to the receiver, and little or no signal being transmitted to locations away from the receiver. At the remote location, the receiver receives and decodes the transmitted data stream.

At present, it is difficult to drive a single amplifier to produce all of the discrete states, and maintain the proper amplitude and phase of the states at sufficiently high power levels. Such amplification often requires that the amplifier operate in a linear region, which can limit the upper and lower power levels that are transmitted by the amplifier.

The system discussed herein can produce and amplify the specified, discrete states in a simpler manner than using a single amplifier. The present system uses multiple amplifiers and radiators that are each driven into one of four discrete, specified states. Driving the multiple amplifiers into the four discrete, specified states avoids the upper and lower power level limitations of a single amplifier operating in the linear region, and can therefore produce more output power than the single, linear-driven amplifier.

The states from the multiple radiators all combine through far-field electromagnetic propagation, and effectively sum at the receiver to mimic transmission from a single amplifier. A standard receiver, with standard electronics, can receive the signal from the present system, and can decode the received signal in a known, standard manner.

The multiple radiators are driven in groups, with the radiators in each group being driven together. The number of radiators in the groups is selected so that the full range of amplitudes and phases can be achieved by the combined output of all the radiators. In some examples, there are three groups, which include one radiator, two radiators, and four radiators, respectively. In some other examples, there are four groups, which include one radiator, two radiators, four radiators, and eight radiators, respectively. In general, for m groups, the groups can have $2^0$ radiators, $2^1$ radiators, . . . , and $2^{m-1}$ radiators, respectively.

Each radiator can be driven to n states of amplitude and phase. In some examples, the radiators are driven using phase-shift keying (PSK) signals. In PSK signals, the amplitude is held constant, while the phase is set to one of a discrete, specified number of values. For n-PSK signals, the phase values are equally spaced, and are spaced apart by 360 degrees, divided by n. In some examples, the radiators are driven with 4-PSK signals, where each 4-PSK signal can take on one of four specified states that have the same amplitude and differ in phase by 90 degrees. In general, if m PSK signals are used, with each PSK signal being an n-PSK signal, the result is $n^m$-QAM, which has $n^m$ discrete detectable states.

An advantage of using n-PSK signals, and specifically 4-PSK signals, is that an amplifier can use a constant amplitude, and vary only a phase to represent the data stream. Such an amplifier can be run in saturation, as opposed to in a linear regime, and can therefore achieve a greater power output and greater efficiency than a comparable amplifier driven in linearity.

There are potential advantages to generating $n^m$-QAM detection using m stages of n-PSK signals. A first advantage can be that the amplifiers are driven in saturation, which can be significantly easier than driving in a linear regime. A second advantage can be that the individual signals from the antennas are all combined as linearly superimposed fields in the far field, through electro-magnetic propagation though air. Such combination is relatively simple and lossless, and eliminates the need for an explicit, and potentially lossy, combiner, such as a resonant cavity or a transmission line circuit. A third advantage can be that eliminating an explicit combiner also eliminates the need to cool such a combiner. A fourth advantage can be that the present transmission scheme can reduce or eliminate interaction between or among amplifiers, which can occur in reactively combined amplifier arrays, such as resonant cavities. A fifth advantage can be that the present transmission scheme can be compatible with other modulation formats, such as amplitude modulation phase shift keying (AM/PSK) or multi-carrier, e.g., orthogonal frequency-division multiplexing (OFDM).

In practice, the system can include well-defined tolerances on quantities, such as signal amplitudes, signal phases, angles, and others. The tolerances allow for relatively small errors in the quantities that can occur during manufacture, assembly, calibration, and operation. These tolerances can allow the performance of particular components to vary slightly with respect to particular quantities, such as temperature, which can reduce the cost and/or complexity of the components. In a data transmission system where data integrity is essential, such as the present system, the tolerances are typically budgeted in a manner that ensures that during operation, each of the discrete, specified states will not be mistaken for any other of the discrete, specified states, even for extremes in the tolerance ranges. For the purposes of this document, the term approximately is intended to represent a target value, plus or minus an operational tolerance that is well-known to one of ordinary skill in the art.

FIG. 1 is a schematic drawing of an example of a system 100 for transmitting a quadrature amplitude modulation (64-QAM) waveform. The system 100 can include a local oscillator 102 driving a distribution amplifier 104. The distribution amplifier 104 can direct signals through phase shifters 112, 122, 132, and variable attenuators 114, 124, 134 to respective first, second, and third mixers 110, 120, and 130 as a common local oscillator signal.

The system 100 can include an encoder 106 that receives a stream of data as input. The stream of data is encoded by the system 100, and is transmitted by the system 100 to a receiver at a remote location. The encoder 106 encodes the stream of data as three synchronized phase-shift keying (PSK) signals, namely a first PSK signal 118, a second PSK signal 128, and a third PSK signal 138. The PSK signals 118, 128, and 138 pass through respective low-pass filters 116, 126, 136 to the respective first, second, and third mixers 110, 120, and 130.

The first, second, and third mixers 110, 120, and 130 combine synchronized first, second, and third phase-shift keying (PSK) signals 118, 128, and 138 with the common local oscillator signal to form respective first, second, and third amplifiable signals 119, 129, and 139.

A first amplifier 141 receives the first amplifiable signal 119 and powers a first radiator 151 in response to the received first amplifiable signal 119. Second and third amplifiers 142, 143 both receive the second amplifiable signal 129 and power respective second and third radiators 152, 153 in response to the received second amplifiable signal 129. Fourth, fifth, sixth, and seventh amplifiers 144, 145, 146, 147 all receive the third amplifiable signal 139 and power respective fourth, fifth, sixth, and seventh radiators 154, 155, 156, and 157 in response to the received third amplifiable signal 139.

Each of the first, second, third, fourth, fifth, sixth, and seventh radiators 151, 152, 153, 154, 155, 156, and 157 radiates in one of a plurality of allowable discrete, specified states. For instance, the specified states can be represented as $Ae^{i\Phi}$, where A is a specified amplitude, and $\phi$ is a phase that can take on one of four discrete, specified values, such as 0 degrees, 90 degrees, 180 degrees, and 270 degrees, or 45 degrees, 135 degrees, 225 degrees, and 315 degrees. In some examples, the allowable radiated states are approximately the same for all of the radiators.

The radiated states from the first, second, third, fourth, fifth, sixth, and seventh radiators 151, 152, 153, 154, 155, 156, and 157 combine through far-field electromagnetic propagation and effectively sum at the receiver to mimic transmission from a single amplifier. For instance, four allowable states, combined through three groups of radiators, the three groups numbering one, two, and four radiators each, can produce $4^3$, or 64 discrete, specified, detectable states at the receiver. Producing the 64 discrete states in this manner can generate higher transmitted powers than a comparable single amplifier having the same peak power as the coherently summed total of the peak powers of the seven amplifiers 141-147, when that single amplifier is driven in its linear regime.

In some examples, the first, second, third, fourth, fifth, sixth, and seventh radiators 151, 152, 153, 154, 155, 156, and 157 are all the same in structure and function, and are oriented to radiate electromagnetic radiation in approximately the same direction. In some examples, the first, second, third, fourth, fifth, sixth, and seventh radiators 151, 152, 153, 154, 155, 156, and 157 each comprise at least one antenna. For instance, the radiators can each comprise one, two, three, four, five, six, seven, eight, or more than eight antennas. The radiators can, but need not, be arranged contiguously. Similarly, the antennas in each radiator can, but need not, be arranged contiguously. The radiators (antennas) can be arranged to point in approximately the same direction as one another, which can allow a conformal geometric arrangement.

In some examples, the first, second, third, fourth, fifth, sixth, and seventh amplifiers 141, 142, 143, 144, 145, 146, and 147 are all the same in structure and function. In some examples, the first, second, third, fourth, fifth, sixth, and seventh amplifiers 141, 142, 143, 144, 145, 146, and 147 operate in near saturation or full saturation.

In some examples, the first, second, and third amplifiable signals 119, 129, and 139 all have approximately or exactly the same amplitude. In some examples, a combined output of the second and third radiators 152, 153 is approximately twice an output of the first radiator 151. In some examples, a combined output of the fourth, fifth, sixth, and seventh radiators 154, 155, 156, and 157 is approximately twice the combined output of the second and third radiators 152, 153.

In some examples, the encoder 106 uses quadrature phase-shift keying (4-PSK), resulting in the quadrature amplitude modulation waveform 64-QAM.

It is straightforward to modify the system 100 of FIG. 1 to use 256-QAM, rather than 64-QAM. The encoder 106 can be modified to produce four, rather than three, PSK signals. The fourth PSK signal can be directed through a low-pass filter to a fourth mixer, which can produce a fourth amplifiable signal. The fourth amplifiable signal can be directed to eight amplifiers, which power eight respective radiators. The eight amplifiers and can be labeled as the eighth through the fifteenth amplifiers, and the eight radiators can be labeled as the eighth through the fifteenth radiators. The fifteen amplifiers and radiators of a 256-QAM system can all be the same in structure and function as the seven amplifiers and radiators shown in FIG. 1.

Similarly, the system 100 of FIG. 1 can be modified to use 4096-QAM. The encoder can be modified to produce six, rather than three, PSK signals. The fourth PSK signal can produce a fourth amplifiable signal, which can be directed to eight amplifiers. The fifth PSK signal can produce a fifth amplifiable signal, which can be directed to 16 amplifiers. The sixth PSK signal can produce a sixth amplifiable signal, which can be directed to 32 amplifiers. The 63 amplifiers and radiators of a 4096-QAM system can all be the same in structure and function as the seven amplifiers and radiators shown in FIG. 1.

In some examples, the system 100 of FIG. 1 can be modified so that the encoder 106 generates offset 4-PSK (O-4-PSK) signals, where an I data stream and a Q data stream are shifted by a half symbol with respect to each other. Such a modification can produce an offset 64-QAM, with a waveform having an envelope that has no zero transitions.

In some examples, the low-pass filters 116, 126, 136 can taper the rectangular pulses of the O-4-PSK waveform to be sinusoidal, and generate an MSK waveform. System 100 sums the three MSK waveforms to produce a composite waveform similar to an offset 64-QAM, but additionally with continuous symbol-to-symbol transitions. This can provide a signal having a spectrum that decays at a rate of 40 dB per decade, compared with a rate of 20 dB per decade for the rectangular pulses.

Figure 2:
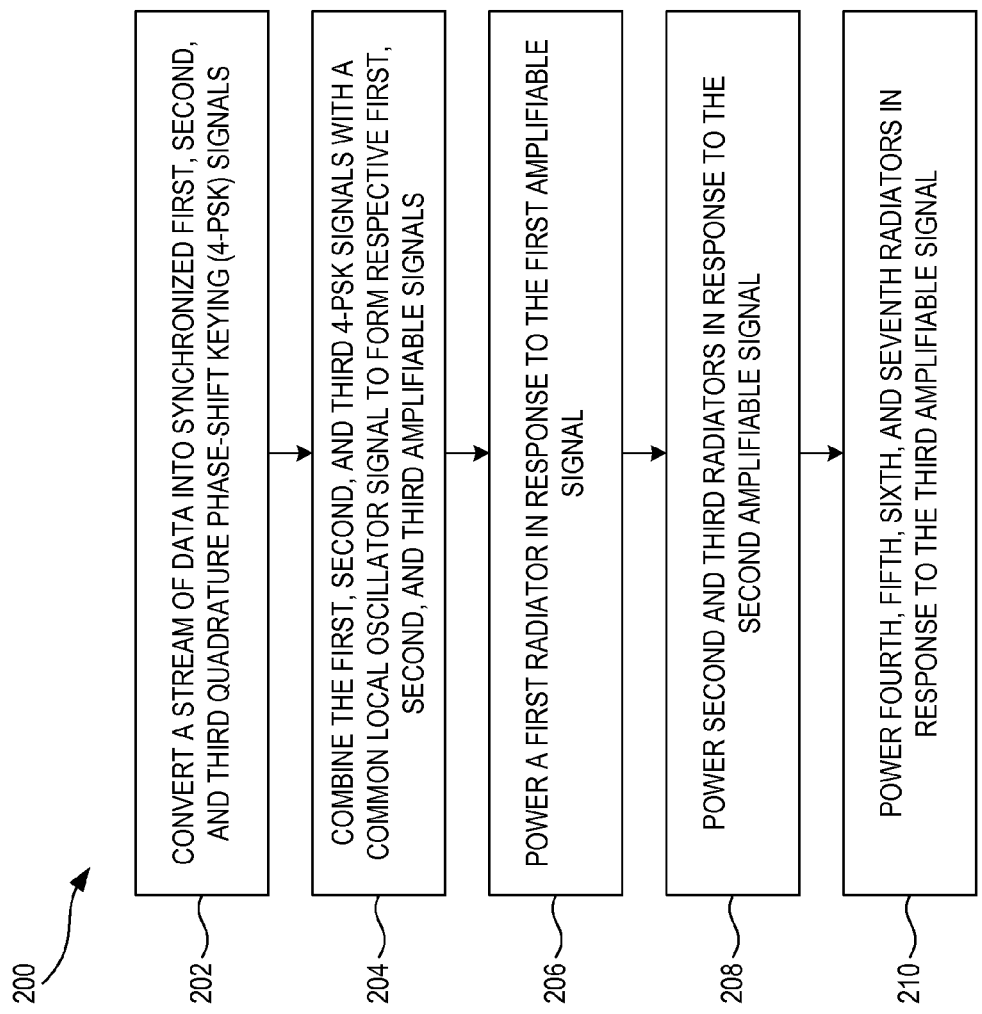
FIG. 2 is a flow chart of an example of a method for transmitting a 64-QAM waveform.

FIG. 2 is a flow chart of an example of a method 200 for transmitting a 64-QAM waveform. The method 200 can be executed on the system 100 of FIG. 1, or on other suitable systems. At 202, method 200 converts a stream of data into synchronized first, second, and third quadrature phase-shift keying (4-PSK) signals. At 204, method 200 combines the first, second, and third 4-PSK signals with a common local oscillator signal to form respective first, second, and third amplifiable signals. At 206, method 200 powers a first radiator in response to the first amplifiable signal. At 208, method 200 powers second and third radiators in response to the second amplifiable signal. At 210, method 200 powers fourth, fifth, sixth, and seventh radiators in response to the third amplifiable signal.

In some examples, the first, second, third, fourth, fifth, sixth, and seventh radiators are all the same in structure and function, are oriented to radiate electromagnetic radiation in approximately the same direction, and each comprise at least one antenna.

In some examples, the first, second, third, fourth, fifth, sixth, and seventh radiators are powered by respective the first, second, third, fourth, fifth, sixth, and seventh amplifiers that are all the same in structure and function, and operate in near saturation or full saturation.

In some examples, the first, second, and third amplifiable signals all have approximately the same amplitude.

Some embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the computer 120 may include one or more processors and may be configured with instructions stored on a computer-readable storage device.

What is claimed is:

1. A system for transmitting a quadrature amplitude modulation (QAM) waveform to a receiver, the system comprising:
    first, second, and third mixers that combine synchronized first, second, and third phase-shift keying (PSK) signals with a common local oscillator signal to form respective first, second, and third amplifiable signals;
    a first amplifier that receives the first amplifiable signal and powers a first radiator in response to the received first amplifiable signal;
    second and third amplifiers that receive the second amplifiable signal and power respective second and third radiators in response to the received second amplifiable signal; and
    fourth, fifth, sixth, and seventh amplifiers that receive the third amplifiable signal and power respective fourth, fifth, sixth, and seventh radiators in response to the received third amplifiable signal;

wherein each of the first, second, third, fourth, fifth, sixth, and seventh radiators radiates in one of a plurality of discrete, specified states; and wherein the radiated states from the first, second, third, fourth, fifth, sixth, and seventh radiators combine through far-field electromagnetic propagation and effectively sum at the receiver to mimic transmission from a single amplifier.

2. The system of claim 1, wherein the first, second, third, fourth, fifth, sixth, and seventh radiators are the same in structure and function, and are oriented to radiate electromagnetic radiation in approximately the same direction.

3. The system of claim 1, wherein the first, second, third, fourth, fifth, sixth, and seventh radiators each comprise at least one antenna.

4. The system of claim 1, wherein the plurality of discrete, specified states have approximately the same amplitudes, and have phases that are approximately equally spaced apart.

5. The system of claim 1, wherein the first, second, third, fourth, fifth, sixth, and seventh amplifiers are all the same in structure and function, and operate in near saturation or full saturation.

6. The system of claim 1, wherein the first, second, and third amplifiable signals have approximately the same amplitude.

7. The system of claim 1,
wherein a combined output power of the second and third radiators is approximately twice an output power of the first radiator; and
wherein a combined output power of the fourth, fifth, sixth, and seventh radiators is approximately twice the combined output power of the second and third radiators.

8. The system of claim 1, further comprising an encoder that converts a stream of data into the synchronized first, second, and third phase-shift keying (PSK) signals.

9. The system of claim 8,
wherein the encoder uses quadrature phase-shift keying (4-PSK); and
wherein the quadrature amplitude modulation waveform is 64-QAM.

10. The system of claim 8,
wherein the encoder uses offset quadrature phase-shift keying (O-4-PSK); and
wherein the quadrature amplitude modulation waveform is offset 64-QAM.

11. The system of claim 10, wherein the O-4-PSK waveform is formed from low-pass-filtered, sinusoidal pulses.

12. A system for transmitting a quadrature amplitude modulation (QAM) waveform to a receiver, the system comprising:
first, second, third, and fourth mixers that combine synchronized first, second, third, and fourth phase-shift keying (PSK) signals with a common local oscillator signal to form respective first, second, third, and fourth amplifiable signals;
a first amplifier that receives the first amplifiable signal and powers a first radiator in response to the received first amplifiable signal;
second and third amplifiers that receive the second amplifiable signal and power respective second and third radiators in response to the received second amplifiable signal;
fourth, fifth, sixth, and seventh amplifiers that receive the third amplifiable signal and power respective fourth, fifth, sixth, and seventh radiators in response to the received third amplifiable signal; and eighth, ninth, tenth, eleventh, twelfth, thirteenth, fourteenth, and fifteenth amplifiers that receive the fourth amplifiable signal and power eighth, ninth, tenth, eleventh, twelfth, thirteenth, fourteenth, and fifteenth radiators in response to the received fourth amplifiable signal;

wherein each of the first, second, third, fourth, fifth, sixth, seventh, eighth, ninth, tenth, eleventh, twelfth, thirteenth, fourteenth, and fifteenth radiators radiates in one of a plurality of discrete, specified states; and wherein the radiated states from the first, second, third, fourth, fifth, sixth, seventh, eighth, ninth, tenth, eleventh, twelfth, thirteenth, fourteenth, and fifteenth radiators combine through far-field electromagnetic propagation and effectively sum at the receiver to mimic transmission from a single amplifier.

13. The system of claim 12, wherein the first, second, third, fourth, fifth, sixth, seventh, eighth, ninth, tenth, eleventh, twelfth, thirteenth, fourteenth, and fifteenth radiators are all the same in structure and function, and are oriented to radiate electromagnetic radiation in approximately the same direction; and
wherein the first, second, third, fourth, fifth, sixth, seventh, eighth, ninth, tenth, eleventh, twelfth, thirteenth, fourteenth, and fifteenth radiators each comprise at least one antenna.

14. The system of claim 12, wherein the plurality of discrete, specified states have approximately the same amplitudes, and have phases that are approximately equally spaced apart.

15. The system of claim 12,
wherein the first, second, third, fourth, fifth, sixth, seventh, eighth, ninth, tenth, eleventh, twelfth, thirteenth, fourteenth, and fifteenth amplifiers are all the same in structure and function, and operate in near saturation or full saturation; and
wherein the first, second, third, and fourth amplifiable signals have approximately the same amplitude.

16. The system of claim 12,
wherein a combined output power of the second and third radiators is approximately twice an output power of the first radiator;
wherein a combined output power of the fourth, fifth, sixth, and seventh radiators is approximately twice the combined output power of the second and third radiators; and
wherein a combined output power of the eighth, ninth, tenth, eleventh, twelfth, thirteenth, fourteenth, and fifteenth radiators is approximately twice the combined output power of the fourth, fifth, sixth, and seventh radiators.

17. The system of claim 12, further comprising an encoder that converts a stream of data into the synchronized first, second, third, and fourth phase-shift keying (PSK) signals.

18. The system of claim 17,
wherein the encoder uses quadrature phase-shift keying (4-PSK); and
wherein the quadrature amplitude modulation waveform is 256-QAM.

19. A method for transmitting a 64-QAM (quadrature amplitude modulation) waveform to a receiver, the method comprising:
converting a stream of data into synchronized first, second, and third quadrature phase-shift keying (4-PSK) signals;
combining the first, second, and third 4-PSK signals with a common local oscillator signal to form respective first, second, and third amplifiable signals;

powering a first radiator in response to the first amplifiable signal;

powering second and third radiators in response to the second amplifiable signal; and powering fourth, fifth, sixth, and seventh radiators in response to the third amplifiable signal;

wherein each of the first, second, third, fourth, fifth, sixth, and seventh radiators radiates in one of a plurality of discrete, specified states; and wherein the radiated states from the first, second, third, fourth, fifth, sixth, and seventh radiators combine through far-field electromagnetic propagation and effectively sum at the receiver to mimic transmission from a single amplifier.

20. The method of claim 19, wherein the first, second, third, fourth, fifth, sixth, and seventh radiators are all the same in structure and function, are oriented to radiate electromagnetic radiation in approximately the same direction, and each comprise at least one antenna;

wherein the first, second, third, fourth, fifth, sixth, and seventh radiators are powered by respective the first, second, third, fourth, fifth, sixth, and seventh amplifiers that are all the same in structure and function, and operate in near saturation or full saturation; and wherein the first, second, and third amplifiable signals have approximately the same amplitude.

* * * * *